United States Patent [19]

Hefel

[11] 4,003,590
[45] Jan. 18, 1977

[54] FLUID-TIGHT FLANGE COUPLING AND METHOD OF MAKING THE SAME

[76] Inventor: Walter Hefel, In der Halde, Berlingen (Thurgau), Switzerland

[22] Filed: Nov. 22, 1974

[21] Appl. No.: 526,368

[30] Foreign Application Priority Data

Nov. 23, 1973 Switzerland .................... 16516/73

[52] U.S. Cl. ............................ 285/336; 285/328; 285/332; 285/368
[51] Int. Cl.² ........................................ F16L 17/06
[58] Field of Search .......... 285/368, 336, 412, 416, 285/24, 27, 95, 328, 332

[56] References Cited

UNITED STATES PATENTS

| | | | |
|---|---|---|---|
| 935,412 | 9/1909 | Rust | 285/412 X |
| 2,066,775 | 1/1937 | Fritsch | 285/416 X |
| 3,458,221 | 7/1969 | Wheeler | 285/368 X |
| 3,749,426 | 7/1973 | Tillman | 285/336 |
| 3,752,509 | 8/1973 | Stafford | 285/368 X |
| 3,836,159 | 9/1974 | Dryer | 285/336 X |
| 3,854,761 | 12/1974 | David | 285/336 |

FOREIGN PATENTS OR APPLICATIONS

| | | | |
|---|---|---|---|
| 486,262 | 11/1929 | Germany | 285/336 |
| 866,423 | 2/1953 | Germany | 285/368 |
| 1,136,757 | 12/1968 | United Kingdom | 285/368 |
| 12,162 | 7/1891 | United Kingdom | 285/368 |

*Primary Examiner*—Werner H. Schroeder
*Assistant Examiner*—Moshe I. Cohen
*Attorney, Agent, or Firm*—Michael J. Striker

[57] ABSTRACT

A coupling for establishing a fluid-tight connection between adjacent open ends of substantially coaxial hollow elements, especially pipes, includes a pair of flanges, each formed from a section of a profiled strand, respectively fitted about the outer surfaces of the elements and provided with contact surfaces arranged to fit upon each other upon axial movement of the flanges toward each other, and in which at least one of the flanges is provided with an annular cutout forming with the other flange and the outer surfaces of the elements at the adjacent ends of the latter an annular space. A compressible or ductile sealing element is located in this annular space, and a device engaging the flanges is constructed to move the latter in axial direction toward each other.

10 Claims, 4 Drawing Figures

FLUID-TIGHT FLANGE COUPLING AND METHOD OF MAKING THE SAME

BACKGROUND OF THE INVENTION

The present invention relates to a flange connection for two hollow elements, especially pipes, in which each element is provided with a flange and in which the flanges are connected to each other by a device constructed to move the flanges in axial direction toward each other, with a deformable sealing element sandwiched between the flanges. The present invention relates also to a method of making the mentioned flange connection.

In a known flange connection of the aforementioned kind the flanges are formed by discs having each a central opening through which the respective pipe ends extend and which flanges are at the periphery of the opening welded to the respective pipes. The disadvantage of this known flange connection is that for each pipe diameter a flange of a corresponding opening diameter must be manufactured and held in storage. Usually there are even pipes with flanges provided thereon held in storage. Furthermore, the opening in each flange has to correspond to the cross-section of the pipe so that for pipes with circular cross-section different flanges are necessary than for pipes with for instance square cross-section.

It is also known to form the flanges of the aforementioned kind not only as cast, forged or stamped members, but to form these flanges from profiled sections which are bent and welded to each other at adjacent ends so as to form annular members with an inner surface fitted to the outer surface of the elements which are to be fluid-tightly connected to each other and such flanges are especially used for the fluid-tight connection of boiler elements or the like.

SUMMARY OF THE INVENTION

It is an object of the present invention to provide a flange connection of the aforementioned kind which does not require to maintain a supply of flanges of different size and form of its central opening or to maintain a supply of pipes with flanges integrally formed thereon.

It is a further object of the present invention to provide for a fluid-tight flange connection which can be manufactured at reasonable cost regardless of the hollow elements or pipes which are to be connected by the flange connection.

With these and other objects in view, which will become apparent as the description proceeds, the coupling for establishing a fluid-tight connection between adjacent open ends of two at least substantially coaxial hollow elements, especially pipes, mainly comprises a pair of annular flanges, each comprising a section of a profiled strand respectively fitted about the outer surface of the respective element and each having a contact surface facing the contact surface of the other flange and arranged to contact each other upon axial movement of the flanges toward each other. At least one of the flanges is provided with an annular cutout forming with the other flange and the outer surface of said elements at their adjacent ends thereof an annular space. A compressible or ductile sealing element is located in this annular space, and means engaging the flanges for moving the same toward each other are provided so as to bring the contact surfaces thereof in engagement with each other and to compress the sealing element in tight engagement with the surfaces defining the annular space, to thus seal the gap between the adjacent open ends of the elements.

The facing contact surfaces of the flanges are preferably formed in such a manner, for instance by inclined faces on projecting portions of the two flanges, so that the two elements to be connected to each other are fixed relative to each other against movement in radial direction. The same result may also be obtained when the aforementioned contact surfaces are stepped, serrated or castellated.

One of the flanges may also be provided adjacent its contact surface with an annular groove open towards the aforementioned space for receiving a portion of the sealing element when the latter is axially compressed.

In order to prevent a portion of the sealing element from penetrating into the gap between the two elements to be connected, this gap may be bridged by a band in engagement with the outer surfaces of the two elements.

The sealing element is preferably formed from a section of a strand of sealing material.

The method according to the present invention for manufacturing the above-described flange connection mainly comprises the steps of fitting profiled strand sections respectively about the outer surfaces of said elements, spaced from the open ends thereof, to form a pair of annular flanges about these outer surfaces in such a manner that the contact surfaces of the flanges face each other, placing a compressible sealing element in the annular space formed by the cutout in one of the flanges, the other flange and the outer surfaces of the elements, and subsequently contracting each of the flanges first in radial direction and subsequently pressing said flanges in axial direction by a tightening device toward each other.

In order to prevent contact between a medium contained in the hollow elements and the sealing element, the gap between the adjacent ends of the elements may be covered by a band placed in the aforementioned annular space before the sealing element is placed therein, or the band may be placed on the sealing element before the latter is placed in the annular space whereby the band is placed on the sealing element in such a manner as to cover the gap between the adjacent ends after the sealing element and the band thereon are placed in the annular space.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
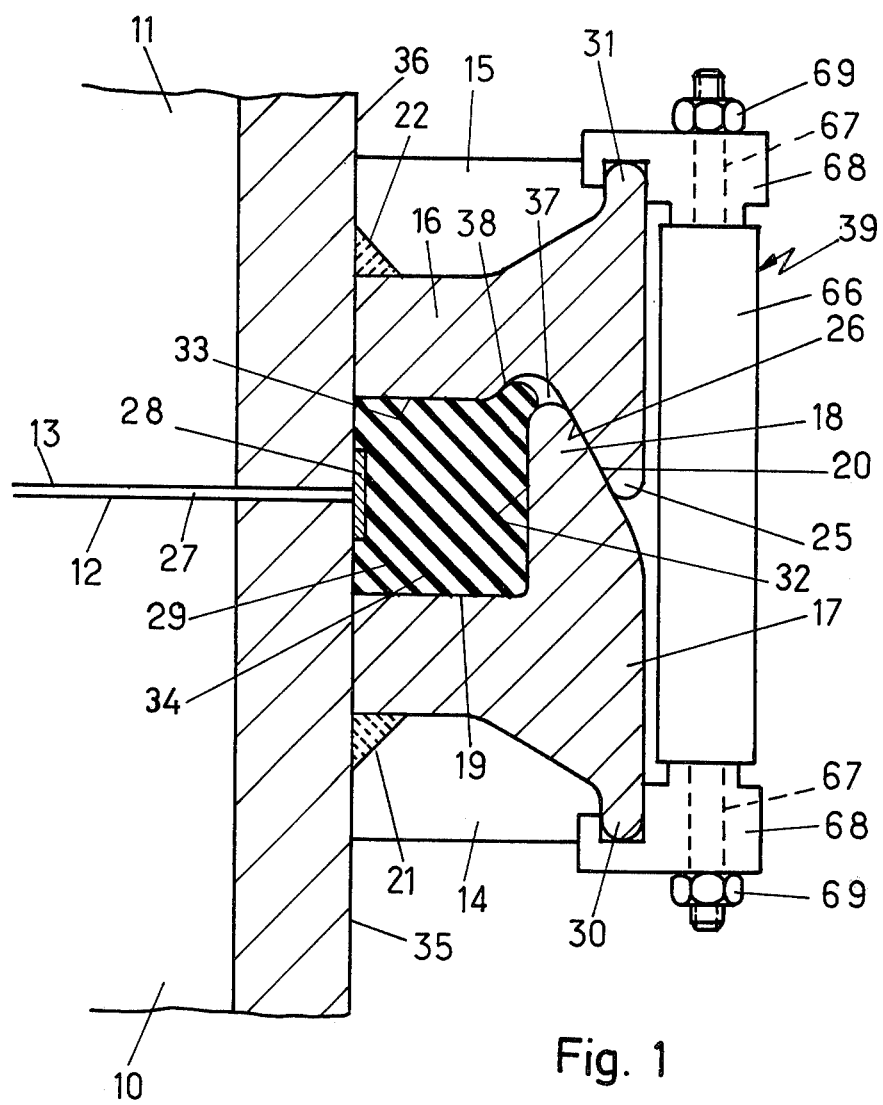
FIG. 1 is a partial axial cross-section through a first embodiment of the flange connection according to the present invention.

In the embodiment illustrated in FIG. 1, the two substantially coaxially arranged pipes or hollow elements 10 and 11 are provided in the region of the adjacent ends 12, and 13 with flanges 14, and 15, respectively. The flange 14 is provided with an annular cutout 19 forming at one side of the cutout an axially extending annular rim 18 having on its outer periphery an inclined contact surface 20. The flange 15 is also provided with an axially extending rim 25 which at its inner surface is formed with an inclined contact surface 26 having the same inclination to the axis of the flange as the contact surface 20. When the two flanges 14 and 15 are moved in axial direction towards each other the aforementioned contact surfaces may slide along each other, and therefore center the two flanges 14 and 15 one versus the other. The cutout 19 is closed at its upper end by the body 16 of the flange 15 and substantially closed on the side opposite the inner face 32 of the rim 18 by the outer surfaces 35 and 36 of the elements 10 and 11. Both flange 14 and 15 are formed from sections of a strand of material having a profile according to the cross-section of the respective flanges, which sections are fitted by bending to the outer surfaces of the pipes or hollow elements 10 and 11 in the region of their ends 12 and 13. The aforementioned profiled strand sections have therefore to be of deformable material, for instance metal or plastic material. The two ends of the strand sections are preferably welded to each other, after bending, to form a closed ring from each of the flange sections.

The gap 27 between the ends 12 and 13 of the elements 10 and 11 is preferably bridged by a band 28 impermeable to fluids. The annular space 19 is packed with a sealing element 29 of compressible material. This sealing element 29 is formed by a section of a strand of sealing material which may for instance have a rectangular cross-section. The strand of sealing material can also be profiled or be composed of a plurality of superimposed strands. The flanges 14 and 15 are also provided with annular axially extending ribs 30 and 31, respectively, on the outer peripheries thereof which respectively project in a direction opposite to the above-mentioned rims. Both flanges 14 and 15 are pressed in axial direction against each other by at least two clamping devices 39, only one of which is shown in FIG. 1, which engage the axial ribs 30 and 31 so that the sealing element 29 in the annular space 19 is compressed and sealingly engages the outer surface of the band 28, the surfaces 32, 33 and 34 of the flanges and the outer surfaces 35, 36 of the elements 10 and 11. The band 28 serves also to protect the sealing element 29 from any corrosive medium in the interior of the elements 10 and 11. The flange 15 is provided adjacent its portion contacting the flange 14 with an annular groove 37 open toward the annular space or cutout 19 so that a portion 38 of the sealing element 29 may be displaced during the compression of the latter into this annular groove, as clearly shown in FIG. 1. Each clamping device 39 may comprise an elongated member 66 provided at opposite ends thereof with screw extensions 67 integrally formed therewith and a pair of hook-shaped members 68 respectively engaging the axially extending ribs 30 and 31 and formed with bores through which the screw extensions 67 pass so that by tightening the nuts 69 the two flanges 14 and 15 may be pressed in axial direction towards each other. Care has to be taken that the length of the elongated member 66 is such that when the hook-shaped members 68 respectively engage the opposite ends of the elongated member 66 a proper compression of the sealing element 29 will be carried out. Preferably, a small clearance should be maintained between the opposite faces of the elongated member 66 and the two hook-shaped members 68 when the sealing element 29 is properly compressed.

In the modification shown in FIG. 1 the two flanges 14 and 15 are respectively connected by weld seams 21 and 22 to the pipes 10 and 11.

Figure 2:
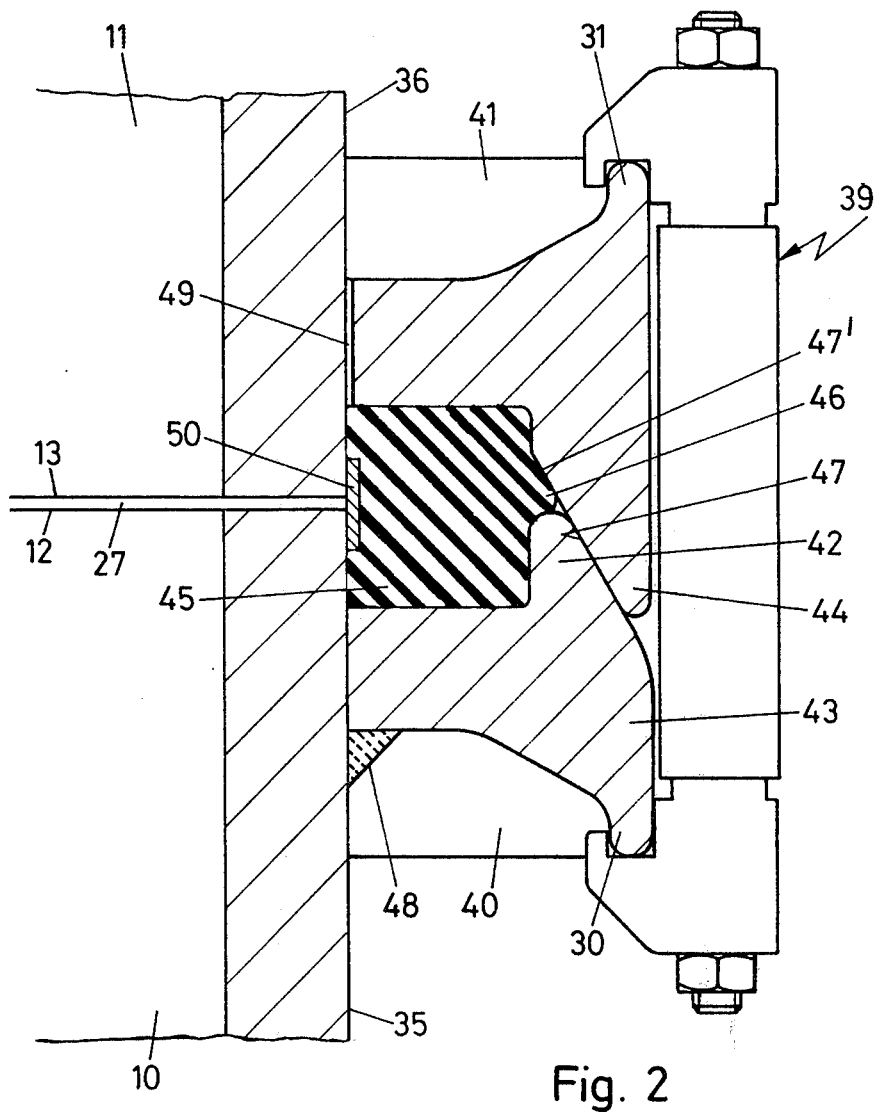
FIG. 2 is a partial axial cross-section through a second embodiment.

FIG. 2 illustrates a slight modification of the arrangement shown in FIG. 1. In FIG. 2 the two elements which are to be sealingly connected to each other are designated with the same reference numerals as in FIG. 1. The two flanges 40 and 41 are in the embodiment shown in FIG. 2 slightly differently configurated than the flanges 14 and 15 described above. As can be seen from FIG. 2, the annular, axially extending rim 42 at the outer circumference 43 of the flange 40 is considerably shorter than the annular rim 18 of the flange 14, whereas the annular rim 44 of the flange 41 is correspondingly longer. In this modification forming a groove as shown at 37 in FIG. 1 is not necessary since a portion of the sealing element 45 may during the compression thereof, penetrate into the space 46 between the annular rim 42 on the flange 40 and the contact surface 47' of the annular rim 44 of the flange 41.

In the embodiment shown in FIG. 2, only the flange 40 is connected by a weld seam 48 with the pipe 10, and in order to facilitate insertion and removal of the pipe 11, the flange 41 is pushed into the pipe with clearance so that between the inner surface of the flange 41 and the outer surface of the pipe 11 a clearance gap 49 remains. This clearance gap 49 is, however, properly sealed by the sealing element 45 after the flanges 40 and 41 are pressed in axial direction towards each other. In order to place the pipe 11 into or remove the same from the arrangement, it is sufficient that the flange 41 together the sealing element 45 and eventually with the band 50 be moved in axial direction upwardly.

In the same manner it would also be possible to eliminate, for instance, the weld seam 21 shown in the embodiment illustrated in FIG. 1 so that the pipe 10 may be placed into or removed from the flange 14 in axial direction when the latter together with the sealing element 29 and eventually the band 28 is moved downwardly in axial direction.

Figure 3:
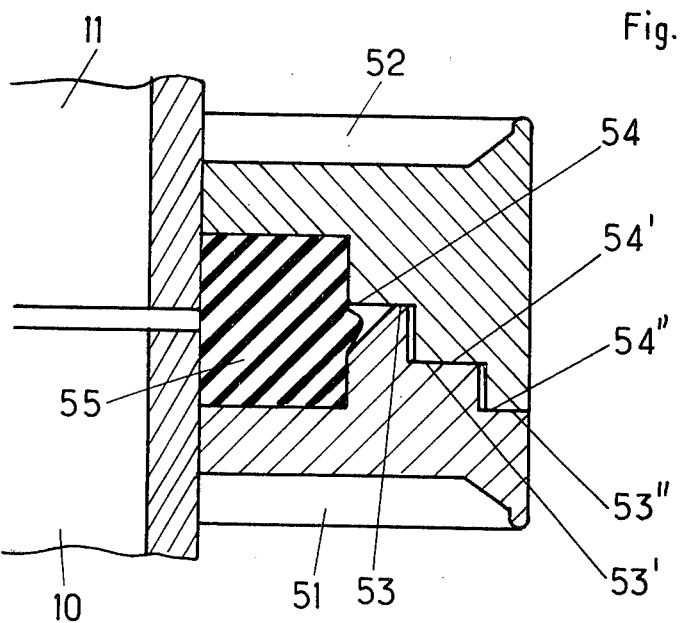
FIG. 3 is a partial axial cross-section through a third embodiment.
Figure 4:
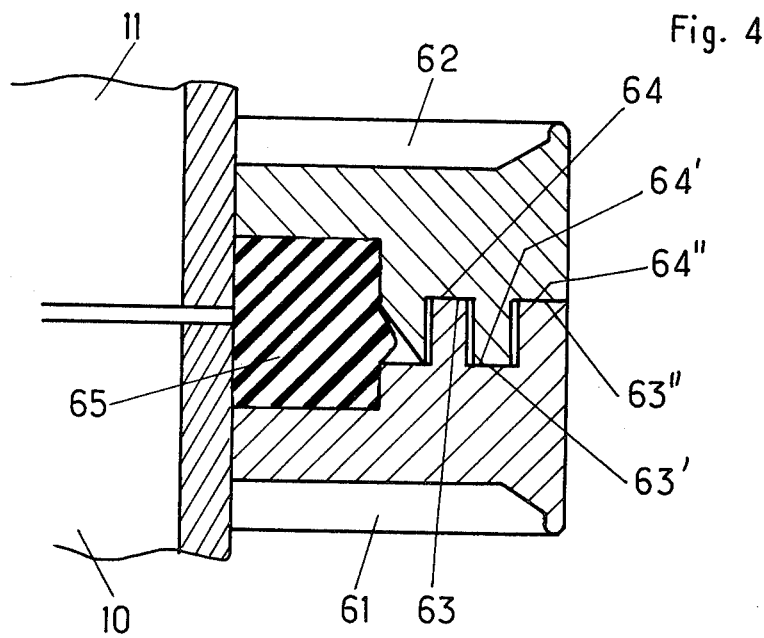
FIG. 4 is a partial axial cross-section through a fourth modification, with the means for moving the flanges toward each other omitted from FIGS. 3 and 4.

FIGS. 3 and 4 illustrate further modifications of the flange coupling. In the modifications shown in FIGS. 3 and 4, the clamping device 39 is omitted, for simplification, from these Figures.

In the embodiment illustrated in FIG. 3 the flanges 51 and 52 are respectively formed with stepped contact surfaces 53, 53', 53'', and 54, 54', 54'' respectively which may be in contact with each other after the two flanges are pressed together in axial direction by a clamping device 39 as shown in FIGS. 1 and 2. The staggered arrangement of the contact surfaces will prevent any substantial lateral movement of the flanges with respect to each other. The flange 51 is provided at the inner edge of the contact surface 53 with a cutout for displacement of a portion of the sealing element 55 placed in the annular space formed by the flange 51, when the sealing element is compressed.

FIG. 4 shows a serrated or castellated configuration of the contact surfaces 63, 63', 63'', and 64, 64', 64'' respectively of the two flanges 61 and 62. The inner surface of the flange 62 has at its lower end an outwardly inclined face so as to provide room for a bulging portion of the sealing element 65 during compression of the latter. It is to be understood that the flanges respectively shown in FIGS. 3 and 4 may be connected by weld seams to the respective pipes or hollow elements 10 and 11, as shown in FIG. 1, or that only one of the flanges need be connected by a weld seam to the respective pipe whereas a clearance gap as shown at 49 in FIG. 2 may be maintained between the inner surface of the other of the flanges and the outer surface of the respective pipe.

The above-described flange connections are manufactured in accordance with the present invention in the following manner:

A strand of deformable material, such as metal or plastic, having a profile according to the cross-section of the flanges 14 and 40, respectively, and a length corresponding to the outer circumference of the pipe 10 is fitted by bending, eventually with simultaneous heating, to the outer circumference of the pipe 10. Depending upon the deformability of the material from which the strand is formed, the fitting may be carried out manually, for instance by hammering, or by means of well-known mechanical devices. Subsequently the section is severed from the strand. Thus the flanges 14 and 40, respectively, are formed. The flanges 15 and 41, respectively, are formed in the same manner from an elongated strand having a profile corresponding to the respective cross-section of the flanges 15, and 41. The annular space formed in the flanges 14 and 40, respectively, is thereafter filled by a section of a strand of sealing material corresponding to respective sealing elements 29 and 45. Thereafter, the respective flange 14, 40 and 15, 41 are first tightened in radial direction to assure that both ends of the severed profiled strand sections will engage or be closely adjacent to the outer surface of the pipe 10 and subsequently the flanges 14 and 15, and the respective the flanges 40 and 41 are pushed together in axial direction by the clamping device 39 until a secure connection and the seal between the facing ends of the pipes or hollow elements 10 and 11 is obtained. Before the two flanges are pushed together in axial direction by the clamping device 39, at least one of the flanges is preferably welded by a weld seam as for instance shown at 21 in FIG. 1 or at 48 in FIG. 2 to the respective pipe. However this, or a welding of the two ends of the severed profiled strand forming the flange 15 to each other is not absolutely necessary to prevent spreading of the flange 15, because the flanges 14 and 15 are drawn together in axial direction only until the contact surfaces 20 and 26 come into tight contact with each other. The height of the sealing element 29, in uncompressed condition, has to be chosen in such a manner that when the contact surfaces 20 and 26 are tightly engaged a proper compression of the sealing element will occur to assure the desired tight seal. The same remarks hold true for the flange 41, and the contact surfaces 47 and 47' of the embodiment shown in FIG. 2.

It is to be understood that in the embodiment shown in FIG. 1 only one of the flanges is to be connected by a weld seam to the respective pipe before the two flanges are drawn together by the device 39, except if the two pipes can be axially moved relative to each other with the flanges.

If the sealing elements 29 and 45, respectively have to be protected against a corrosive medium in the pipes 10 and 11, and/or if squeezing of a portion of the respective sealing element into the gap 27 between adjacent pipe ends, then the gap 27 between the ends is to be prevented 12 and 13 of the pipe may be bridged by a band such as 28 or 50, whereby the band may be connected to one of the two pipes by a plurality of spot welds, or the band may also be connected in any convenient manner to the sealing element.

As mentioned before, the two ends of each flange are preferably welded to each other to form a closed ring from each flange, especially if the flange connections are used for pipes or hollow container elements of large diameter.

Evidently, the flanges may also be formed in such a manner that the sections of the elongated profiled strands are severed from the latter before fitting the sections to the outer surfaces of the respective pipes.

It will be understood that each of the elements described above, or two or more together, may also find a useful application in other types of flange connections differing from the types described above.

While the invention has been illustrated and described as embodied in a flange connection in which each flange is formed from a section of a profiled strand, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A sealed joint, comprising a pair of tubular hollow elements having adjacent open ends which together define a gap; a pair of annular flanges applied about the outer surfaces of said tubular hollow elements, each of said flanges being formed from a profiled strand whereby each of said flanges is bent about the outer surface of a different one of said tubular hollow elements, said one flange being shaped so as to conform to the contour of the outer surface of the respective tubular hollow element and said flanges having abutting contact surfaces, at least one of said flanges being provided with an annular recess which, together with the other flange and the outer surfaces of said ends of said tubular hollow elements, defines an annular space in the region of said open ends which extends across said gap; a compressible sealing element in said annular space positioned outwardly of and extending across said gap and covering said ends of said tubular hollow elements, said sealing element being in compression due to the proximity of said flanges to one another, and said sealing element abutting the outer surfaces of said tubular hollow elements and exerting pressure on the same and at said gap from outwardly thereof to thereby prevent the passage of fluid through said gap; and means for disengaging and engaging said flanges.

2. A joint as defined in claim 1, wherein one of said flanges is provided adjacent its contact surface with an annular groove open towards said annular space for receiving a portion of said sealing element.

3. A joint as defined in claim 1, and including a band of deformable material in said annular space in engagement with the outer surfaces of said ends of said tubular hollow elements and bridging the gap between said adjacent ends thereof.

4. A joint as defined in claim 1, wherein said sealing element is constituted by a strand of sealing material located in said annular space.

5. A joint as defined in claim 1, wherein at least one of said flanges has an annular axially extending rib facing away from the other of said flanges for engagement with said disengaging and engaging means.

6. A joint as defined in claim 1, wherein said profiled strand is formed from deformable material.

7. A joint as defined in claim 1, and including at least one weld seam connecting one of said flanges to the outer surface of the end of one of said tubular hollow elements.

8. A joint as defined in claim 1, wherein said contact surfaces are inclined to the direction of movement of said flanges toward each other.

9. A joint as defined in claim 1, wherein said tubular hollow elements are arranged in substantially coaxial alignment.

10. A joint as defined in claim 1, wherein said contact surfaces are formed so that they matingly engage one another and both of said flanges are formed from a profiled strand.

* * * * *